United States Patent Office 3,819,615
Patented June 25, 1974

3,819,615
PROCESS FOR THE MANUFACTURE OF STILBENE COMPOUNDS
Adolf Emil Siegrist, Basel, Switzerland, assignor to Ciba-Geigy AG, Basel, Switzerland
No Drawing. Filed Nov. 6, 1972, Ser. No. 304,289
Claims priority, application Switzerland, Nov. 22, 1971, 16,948/71
Int. Cl. C07d 55/02
U.S. Cl. 260—240 C     13 Claims

ABSTRACT OF THE DISCLOSURE

The present invention provides a process for the manufacture of stilbene compounds of the formula

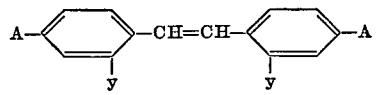

wherein A stands for a benzo[b]furan-2-yl, naphtho-[1,2-b]furan-2-yl, naphtho[2,1-b]furan-2-yl, benzo[b]thiophen-2-yl, naphtho[2,1-b]thiophen-2-yl, benzoxazol-2-yl, naphthoxazol-2-yl, benzotriazol-2-yl, naphtho[1,2-d]triazol-2-yl, benzo[1,2-d:3,4-d']bis-triazol-2-yl or phenethinyl radical, which itself can again be substituted by chlorine or alkyl, cyclohexyl phenyl-(1-4C)-alkyl, phenyl, methylenedioxy, phenoxy or alkoxy groups or which can contain a 6-membered carbocylic ring which is fused to it and wherein y stands for a hydrogen atom, chlorine or the N,N-dimethylcarbamyl radical, characterised in that a compound of the formula

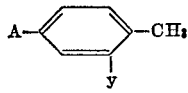

wherein A and y have the previously indicated meaning is oxidised in dimethylformamide, whilst excluding air, in the presence of a potassium compound of the formula $$KOC_{(x-1)}H_{(2x-1)}$$

wherein x denotes an integer from 1 to 6, with an azobenzene of the formula

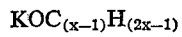

wherein $Z_1$ and $Z_2$ stand for hydrogen or chlorine; the present invention further provides new stilbene derivatives which can be manufactured according to this process and which can be used as optical brighteners.

The present invention concerns a new process for the manufacture of stilbene compounds, new stilbene derivatives which can be manufacture according to this process, and also their application as optical brighteners. The new process of manufacture serves for the manufacture of compounds of the general formula (2) 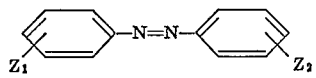

wherein A stands for a benzo[b]furan-2-yl, naphtho-[1,2-b]furan-2-yl, naphtho[2,1-b]furan-2-yl, benzo[b]thiophen-2-yl, naphtho[2,1-b]thiophen-2-yl, benzoxazol-2-yl, naphthoxazol-2-yl, benzotriazol-2-yl, naphtho[1,2-d]triazol-2-yl, benzo[1,2-d:3,4-d']bis-triazol-2-yl or phenethinyl radical, which itself can again be substituted by chlorine or alkyl, cyclohexyl phenyl-(1-4C)-alkyl, phenyl, methylenedioxy, phenoxy or alkoxy groups or which can contain a 6-membered carbocyclic ring which is fused to it and wherein y stands for a hydrogen atom, chlorine or the N,N-dimethylcarbamyl radical. It is characterised in that a compound of the formula (2) 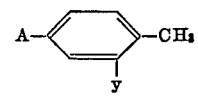

wherein A and y have the previosuly indicated meaning is oxidised in dimethylformamide, whilst excluding air, in the presence of a potassium compound of the formula (3)     $KOC_{(x-1)}H_{(2x-1)}$ wherein x denotes an integer from 1 to 6, with an azobenzene of the formula (4) 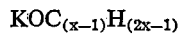

wherein $Z_1$ and $Z_2$ stand for hydrogen or chlorine.

In this reaction, two molecules of the compound of the formula (2) react at the methyl groups, forming an ethylene group:

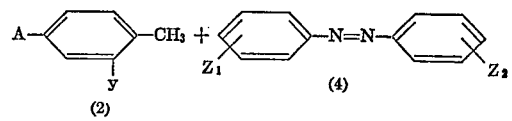

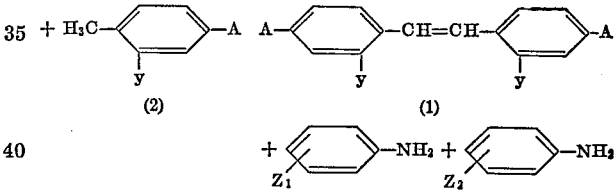

in which A, y, $Z_1$ and $Z_2$ have the indicated meaning.

So far two processes have become known, with which the manufacture of stilbene compounds, especially heterocyclic stilbene compounds, is possible when starting from the corresponding methyl substituted starting substances.

In the first process, in accordance with Swiss Patent Specification No. 477,469, molecular oxygen is used as the oxidising agent and in the second process, according to Swiss Patent Specifications No. 413,218 and 417,944, sulphur is used as the oxidising agent. Surprisingly it has since then been found that the oxidation of the methyl groups of the compounds

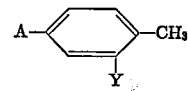

by no means requires the energetic conditions which, in accordance with hitherto held views, appeared to be necessary. On the contrary, the oxidation with azobenzene is not only achieved completely, but it is especially characterized by the fact that a too far-reaching oxidation at the methyl group, to give the carboxyl group, does not occur, so that fewer by-products are formed and significantly higher yields are achieved. In comparison with the oxidation with sulphur, the advantage of the present process is to be found in the significantly lower reaction temperatures, that is to say 20 to 100° C. instead of 200 to 300° C.

By means of the process in accordance with the invention, the following types of compounds can be manufactured in an advantageous manner:

(a) Compounds of the formula (5)

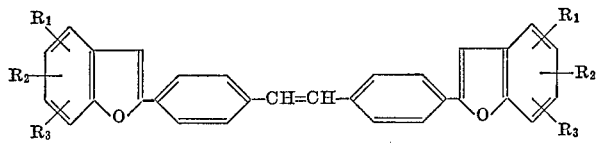

wherein $R_1$ denotes hydrogen, an alkyl group containing 1 to 4 carbon atoms, an alkoxy group containing 1 to 4 carbon atoms, benzyl, phenyl or chlorine, $R_2$ and $R_3$ stand for a hydrogen atom or methyl and in which two neighbouring symbols $R_2$ and $R_3$ can form a fused aromatic carbocyclic six-membered ring. In this case the starting substances are compounds of the formula (6)

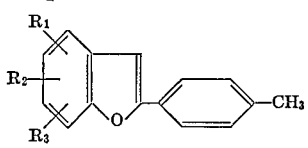

wherein $R_1$, $R_2$ and $R_3$ have the abovementioned meaning.

(b) Compounds of the formula (7)

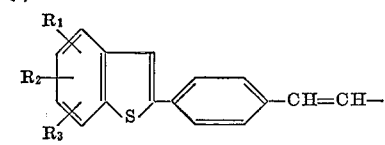

for which compounds of the formula (8)

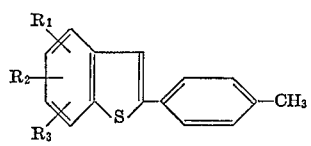

serve as starting substances and $R_1$, $R_2$ and $R_3$ have the meaning indicated under formula (5).

(c) Compounds of the formula (9)

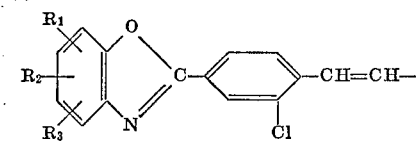

for which compounds of the formula (10)

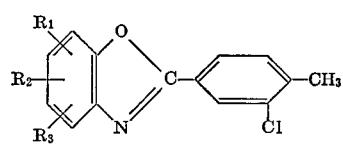

serve as starting substances and $R_1$, $R_2$ and $R_3$ have the meaning indicated under formula (5).

(d) Compounds of the formula (11)

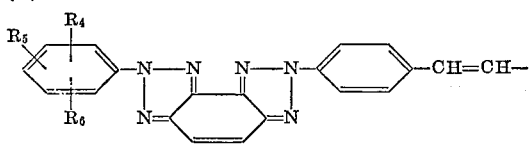

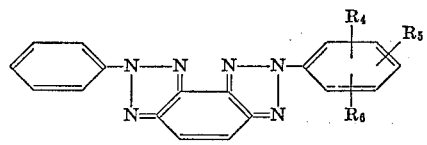

wherein $R_4$ denotes hydrogen, an alkyl group containing 2–4 C atoms, an alkoxy group containing 1–4 C atoms, benzyl, phenyl or chlorine, $R_5$ and $R_6$ stand for hydrogen or methoxy, and two adjacent symbols $R_5$ and $R_6$ can form a fused, aromatic carbocyclic six-membered ring.

In this case the starting substances are compounds of the formula (12)

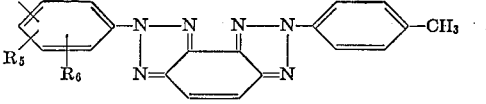

wherein $R_4$, $R_5$ and $R_6$ have the previously indicated meaning.

(e) Compounds of the formula (13)

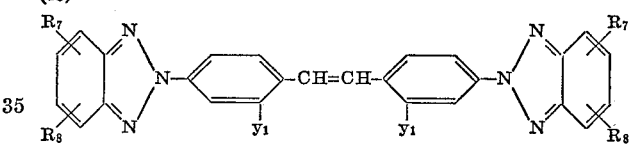

wherein $R_7$ and $R_8$ are identical or different and stand for hydrogen or an alkoxy group containing 1 to 4 carbon atoms and two adjacent symbols $R_7$ ad $R_8$ can form a fused aromatic carbocyclic six-membered ring or a methylenedioxy group and wherein $y_1$ stands for hydrogen, chlorine or an N,N-dimethylcarbamyl group.

In this case the starting substances are compounds of the formula (14)

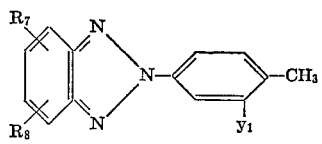

wherein $y_1$, $R_7$ and $R_8$ have the previously indicated meaning.

(f) Compounds of the formula (15)

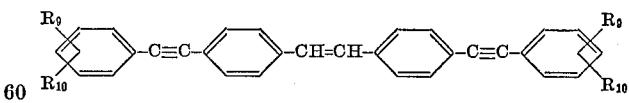

wherein $R_9$ denotes hydrogen, an alkoxy group containing 1 to 4 carbon atoms, phenyl or chlorine, $R_{10}$ stands for hydrogen or the methoxy group and two adjacent radicals $R_9$ and $R_{10}$ can form a fused, aromatic, carbocyclic six-membered ring or a methylenedioxy group.

In this case the starting substances are compounds (16)

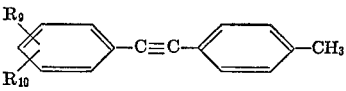

wherein $R_9$ and $R_{10}$ have the previously indicated meaning.

The process in accordance with the invention provides an extraordinarily favourable route to a series of known compounds and to their analogues. Furthermore, a whole

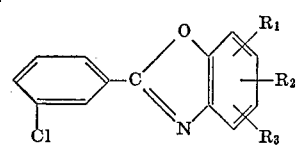

series of interesting new compounds can be obtained, to which especially compounds of the formula

(17) 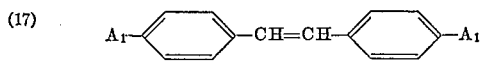

belong, wherein $A_1$ denotes a radical of the formulae

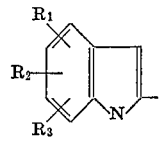

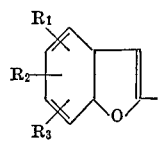

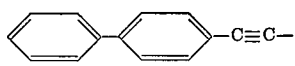

and wherein $R_1$ denotes hydrogen, an alkyl group containing 1 to 4 carbon atoms, an alkoxy group containing 1 to 4 carbon atoms, benzyl, phenyl or chlorine, $R_2$ and $R_3$ stand for a hydrogen atom or methyl and in which two adjacent symbols $R_2$ and $R_3$ can form a fused, aromatic carbocyclic six-membered ring.

New compounds, valuable as optical brighteners, correspond to the formulae (18)

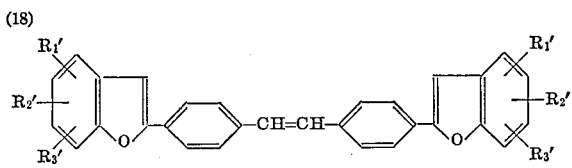

wherein $R_1'$ denotes hydrogen, an alkyl group containing 1 to 4 carbon atoms, an alkoxy group containing 1 to 4 carbon atoms, benzyl, phenyl or chlorine and $R_2'$ and $R_3'$ stand for hydrogen or methyl, preferably (19)

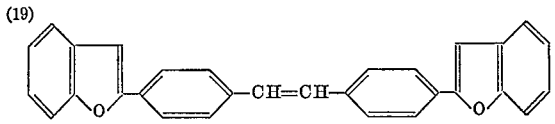

(20)

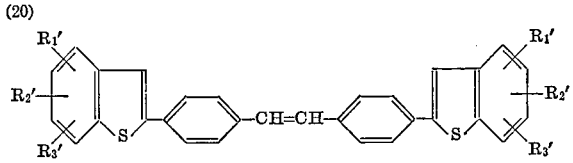

wherein $R_1'$, $R_2'$ and $R_3'$ have the meaning given above and the compound of the formula (21)

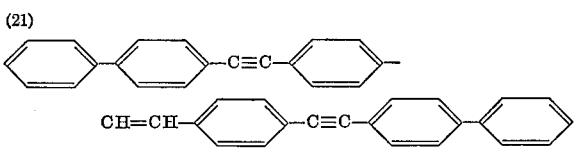

In accordance with the process, the compounds of the formula (2) are reacted with 0.5 to 2 mol equivalents of an azobenzene compound of the formula (4) 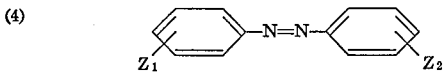

wherein $Z_1$ and $Z_2$ stand for hydrogen and chlorine, but preferably with azobenzene, in dimethylformamide with a potassium compound of the composition (3) $\quad KOC_{(x-1)}H_{(2x-1)}$ wherein $x$ denotes an integer of 1 to 6, such as for example potassium hydroxide or potassium-t-butylate, at temperatures between 20 and 100° C. 1 to 8 equivalents of potassium hydroxide, which can contain 0 to 15 percent by weight of water, are preferably used per methyl group to be reacted. Practical considerations have shown azobenzene to be the most important oxidising agent.

The compounds of the formulae (18), (19), (20) and (21) are suitable as optical brighteners for the most diverse organic materials, especially for the optical brightening of polyamides, polyolefines, cellulose esters (for example cellulose triacetate or also so-called 2½-acetate), polyvinyl chloride or especially polyesters. These compounds can be added as brighteners to the abovementioned materials before or during their shaping. Thus they can for example be added to the compression moulding composition during the manufacture of films or other shaped objects, or be dissolved, dispersed or otherwise finely divided in the spinning composition before spinning. The optical brighteners can also be added to the starting substances, reaction mixtures or intermediate products for the manufacture of wholly or semi-synthetic organic materials, thus also before or during the chemical reaction, for example in the course of a polycondensation, a polymerisation or a polyaddition.

Example 1

5.2 g. of 2-(p-tolyl)-benzo[b]furane of the formula (22)

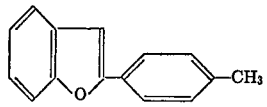

2.28 g. of azobenzene and 12.5 g. of potassium hydroxide powder with a water content of about 10% are stirred in 100 ml. of dimethylformamide whilst excluding air, the mixture is warmed to 90° C. in the course of 30 minutes and stirring is continued for 90 minutes at 90 to 95° C. The reaction mixture is cooled to room temperature, 300 ml. of methanol are thereupon added and the mixture is cooled to 5° C. The precipitated product is filtered, washed with 100 ml. of methanol and dried. 2.8 g. (corresponding to 54.9% of theory) of 4,4-di(benzo[b]furan-2-yl)stilbene of the formula (23)

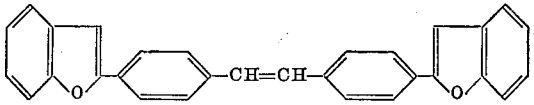

are obtained as a yellow powder, which melts above 360° C. Recrystallising twice from o-dichlorobenzene (fuller's earth) and thereafter from dimethylformamide yields 2.1 g. (41.2% of theory) of very fine greenish-tinged yellow small needles which melt above 360° C.

Analysis: $C_{30}H_{20}O_2$ (412.46). Calculated (percent): C, 87.35; H, 4.89, O, 7.76. Found (percent): C, 87.05; H, 4.96; O, 7.95.

The following stilbene compounds can be prepared in a similar manner:

(24) 4,4'-Di-(5-methyl-benzo[b]furan-2-yl)-stilbene
(25) 4,4'-Di-(6-methyl-benzo[b]furan-2-yl)-stilbene
(26) 4,4'-Di-(4,7-dimethyl-benzo[b]furan-2-yl)-stilbene
(27) 4,4'-Di-(5,6-dimethyl-benzo[b]furan-2-yl)-stilbene
(28) 4,4'-Di-(5,7-dimethyl-benzo[b]furan-2-yl)-stilbene
(29) 4,4'-Di-(4,6,7-trimethyl-benzo[b]furan-2-yl)-stilbene
(30) 4,4'-Di-(5-methoxy-benzo[b]furan-2-yl)-stilbene
(31) 4,4'-Di-(5-chloro-benzo[b]furan-2-yl)-stilbene
(32) 4,4'-Di-(5-phenyl-benzo[b]furan-2-yl)-stilbene
(33) 4,4'-Di-(5-benzyl-benzo[b]furan-2-yl)-stilbene
(34) 4,4'-Di-(benzo[b]thiophen-2-yl)-stilbene
(35) 4,4'-Di-(5-methyl-benzo[b]thiophen-2-yl)-stilbene
(36) 4,4'-Di-(6-methyl-benzo[b]thiophen-2-yl)-stilbene
(37) 4,4'-Di-(5-chloro-benzo[b]thiophen-2-yl)-stilbene
(38) 4,4'-Di-(naphtho[1,2-b]furan-2-yl)-stilbene
(39) 4,4'-Di-(naphtho[2,1-b]furan-2-yl)-stilbene
(40) 4,4'-Di-(naphtho[2,1-b]thiophen-2-yl)-stilbene

Example 2

4.37 g. of 4-methyl-4'-phenyl-tolane of the formula

(41) 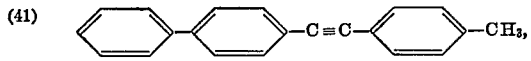

1.82 g. of azobenzene and 10.0 g. of potassium hydroxide powder with a water content of about 10% are stirred in 80 ml. of dimethylformamide whilst excluding air, the mixture is heated to 90° C. for 30 minutes and stirring is continued for 90 minutes at 90 to 95° C. The reaction mixture is cooled to room temperature, 320 ml. of methanol are thereupon added and the mixture is cooled to 5° C. The precipitated product is filtered off, washed with 150 ml. of methanol and dried. 3.2 g. (corresponding to 60.3% of theory) of 4,4'-di(p-phenyl-phenethinyl)-stilbene of the formula

(42) 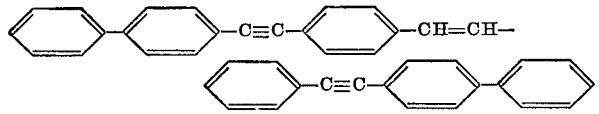

are obtained as a bright yellow powder, which melts above 360° C. After recrystallising twice from o-dichlorobenzene (fuller's earth), 2.2 g. (41.5% of theory) of fine small greenish-tinged yellow needles, which melt above 360° C., are obtained in the form of a felt-like mass.

Analysis: $C_{42}H_{28}$ (532.69). Calculated (percent): C, 94.70; H, 5.30. Found (percent): C, 94.59; H, 5.37.

In a similar manner, 4,4'-di-(phenethinyl)-stilbene of the formula

(43) 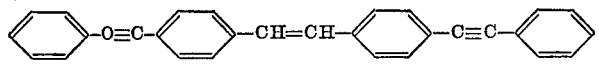

can be obtained from 4-methyl-tolane: bright, greenish-tinged yellow, fine small needles, melting point 288 to 289° C., from xylene.

Example 3

5.44 g. of 2 - chloro-4-(5,6-dimethyl-benzoxazol-2-yl)-toluene of the formula

(44) 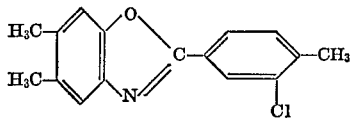

3.64 g. of azobenzene and 5.0 g. of potassium hydroxide powder with a water content of about 10% are stirred in 80 ml. of dimethylformamide whilst excluding air, the mixture is heated in the course of 30 minutes to 40° C. and stirring is continued for one hour at 40 to 45° C. 320 ml. of methanol are now added and the reaction mixture is cooled to 0° C. The precipitated product is filtered off, washed with 120 ml. of methanol and dried. 5.2 g. (corresponding to 96.7% of theory) of 2,2'-dichloro-4,4'-di-(5,6-dimethyl-benzoxazol-2-yl)-stilbene of the formula

(45) 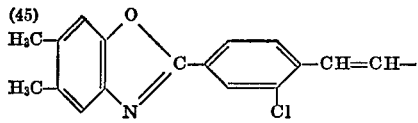

are obtained as a yellow crystalline powder of melting point 340 to 342° C. After recrystallising twice from o-dichlorobenzene (fuller's earth), 3.5 g. (65.0% of theory) of fine greenish-tinged yellow small needles, which melt at 348 to 349° C., are obtained in the form of a felt-like mass.

Analysis: $C_{32}H_{24}Cl_2N_2O_2$ (539.46). Calculated (percent): C, 71.25; H, 4.48; N, 5.19. Found (percent): C, 70.89; H, 4.38; N, 5.24.

The following stilbene compounds can be obtained in a similar manner:

(46) 2,2'-Dichloro-4,4'-di-(benzoxazol-2-yl)-stilbene, melting point: 331 to 332° C.;
(47) 2,2'-Dichloro-4,4'-di-(5-tert.butyl-benzoxazol-2-yl)-stilbene, melting point: 258.5 to 259.5° C.;
(48) 2,2'-Dichloro-4,4'-di-(napth[1,2-d]oxazol-2-yl-(sic)-stilbene, melting point above 360° C.

Example 4

4.88 g. of 2-chloro-4-(benzotriazol-2-yl)-toluene of the formula

(49) 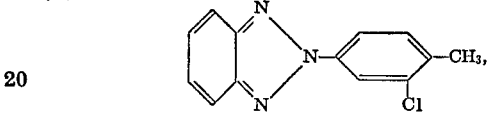

5.02 g. of 4,4'-dichloro-azobenzene and 5.0 g. of potassium hydroxide powder with a water content of about 10% are stirred in 80 ml. of dimethylformamide whilst excluding air, the mixture is heated in the course of 30 minutes to 40° C. and stirring is continued for one hour at 40 to 45° C. 320 ml. [of methanol] are now added and the reaction mixture is cooled to 0° C. The precipitated product is filtered off, washed with 250 ml. of hot methanol and dried. 4.5 g. (corresponding to 93.8% of theory) of 2,2'-dichloro-4,4'-di(benzotriazol-2-yl)-stilbene of the formula

(50) 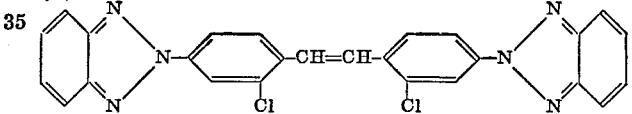

are obtained as a greenish-tinged yellow powder of melting point 327 to 328° C. After recrystallising twice from o-dichlorobenzene (fuller's earth) 4.2 g. (87.5% of theory) of greenish-tinged yellow small needles of melting point 328 to 329° C. are obtained in the form of a felt-like mass.

Analysis: $C_{26}H_{16}Cl_2N_6$ (483.36). Calculated (percent): C, 64.61; H, 3.34; N, 17.39. Found (percent): C, 64.32; H, 3.35; N, 17.47.

If 3.64 g. of azobenzene are used instead of 5.02 g. of 4,4'-dichloroazobenzene, 2,2'-dichloro-4,4'-di - (benzotriazol-2-yl)-stilbene of the formula (50) is obtained with a yield of 89.1% of theory. After recrystallising twice from o-dichlorobenzene (fuller's earth): 78.7% of theory, greenish-tinged yellow small needles of melting point 328 to 329° C. in the form of a felt-like mass.

The following stilbene compounds can be prepared in a similar manner with azobenzene:

(51) 2,2'-Dichloro-4,4'-di-(5-methoxy-benzotriazol-2-yl)-stilbene, melting point: 276 to 277° C.;
(52) 2,2'-Dichloro-4,4'-di-(5,6-dimethoxy-benzotriazol-2-yl)-stilbene, melting point: 353 to 354° C.;
(53) 2,2-Dichloro-4,4'-di-(naphtho[1,2-d]triazol-2-yl)-stilbene, melting point: 353 to 354° C.

Example 5

6.61 g. of 2-(N,N-dimethylcarbamyl)-4-naphtho[1,2-d]triazol-2-yl-toluene of the formula

(54) 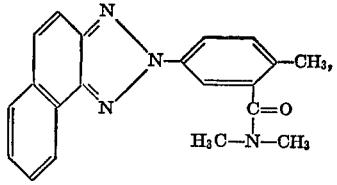

3.64 g. of azobenzene and 10.0 g. of potassium hydroxide powder having a water content of about 10% are stirred in 100 ml. of dimethylformamide whilst excluding air, the mixture is heated to 60° C. in the course of 30 minutes and stirring is continued for one hour at 60 to 65° C. The reaction mixture is cooled to 0° after the addition of 400 ml. of methanol, filtered, washed with 150 ml. of methanol and dried. 4.75 g. (corresponding to 73.1% of theory) of 2,2'-di (N,N - dimethylcarbamyl) - 4,4' - di-(naphth[1,2-d]triazol-2-yl)-stilbene of the formula (55)

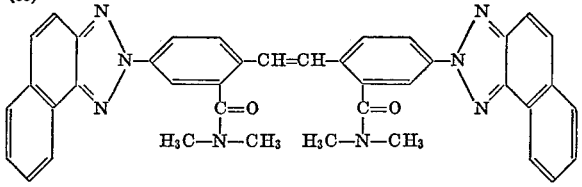

are obtained as a yellow powder of melting point 331 to 332° C. After recrystallising twice from o-dichlorobenzene (fuller's earth), 3.3 g. (50.8% of theory) of very fine small yellow needles, which melt at 332 to 333° C., are obtained as a felt-like mass.

Analysis: $C_{40}H_{32}N_8O_2$ (656.72). Calculated (percent): C, 73.15; H, 4.91; N, 17.06. Found (percent): C, 72.91; H, 4.86; N, 17.06.

Example 6

100 parts of polyester granules of terephthalic acid-ethylene glycol polyester are intimately mixed with 0.05 part of the compound of the formula (23) and fused at 285° C., whilst stirring. After spinning the spinning composition through the customary spinnerets strongly brightened polyester fibres are obtained.

The compound of the formula can also be added to the starting material before or during the polycondensation.

Example 7

10,000 parts of granulated polyamide-6 are mixed with 30 parts of titanium dioxide (rutile modification) and 2 parts of the compound of the formula (23) for 12 hours in a rotating drum. The mixture is melted whilst excluding atmospheric oxygen and the melt is spun in the customary manner. The fibres which are obtained display a strong brightening effect.

If polyamide-6.6 is used instead of polyamide-6, similar strong brightening effects are obtained.

What is claimed is:

1. Process for the manufacture of a stilbene compound[s] of the formula

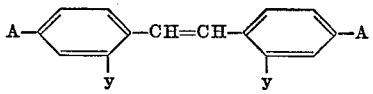

wherein A stands for a benzo[b]furan - 2-yl, naphtho-[1,2 - b]furan - 2-yl, naphtho[2,1-b]furan-2-yl, benzo[b]thiophen-2-yl, naphtho[2,1-b]thiophen-2-yl, benzoxazol-2-yl, naphthoxazol-2-yl, benzotriazol-2-yl, naphtho[1,2-d]triazol-2-yl, benzo[1,2-d: 3,4-d']bis-triazol-2-yl or phenethinyl radical, which itself can again be substituted by chlorine or alkyl, of 1–4 carbon atoms, cyclohexyl, phenyl-(1-4C)-alkyl, phenyl, methylenedioxy, phenoxy or 1–4 carbon atom alkoxy groups or which can contain a 6-membered aromatic carbocyclic ring which is fused to it and wherein y stands for a hydrogen atom, chlorine or the N,N-dimethylcarbamyl radical, characterised in that a compound of the formula

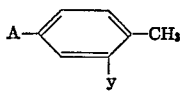

wherein A and y have the previously indicated meaning is oxidised in dimethylformamide, whilst excluding air, in the presence of a potassium compound of the formula $$KOC_{(x-1)}H_{(2x-1)}$$

wherein X denotes an integer from 1 to 6, with an azobenzene of the formula

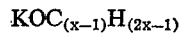

wherein $Z_1$ and $Z_2$ stand for hydrogen or chlorine.

2. Process according to Claim 1, characterized in that a compound of the formula

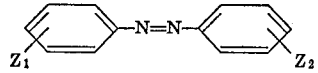

wherein $R_1$ denotes hydrogen, an alkyl group containing 1 to 4 carbon atoms, an alkoxy group containing 1 to 4 carbon atoms, benzyl, phenyl or chlorine, $R_2$ and $R_3$ stand for a hydrogen atom or methyl and in which two adjacent symbols $R_2$ ad $R_3$ can form a fused, aromatic, carbocyclic six-membered ring, is used as starting substance.

3. Process according to Claim 1, characterized in that a compound of the formula

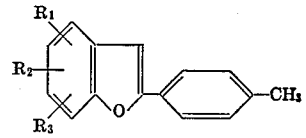

wherein $R_1$ denotes hydrogen, an alkyl group containing 1 to 4 carbon atoms, an alkoxy group containing 1 to 4 carbon atoms, benzyl, phenyl or chlorine, $R_2$ and $R_3$ stand for a hydrogen atom or methyl and in which two adjacent symbols $R_2$ and $R_3$ can form a fused, aromatic, carbocyclic cyclic six-membered ring, is used as starting substance.

4. Process according to Claim 1, characterised in that a compound of the formula

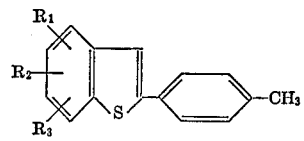

wherein $R_1$ denotes hydrogen, an alkyl group containing 1 to 4 carbon atoms, an alkoxy group containing 1 to 4 carbon atoms, benzyl, phenyl or chlorine, $R_2$ and $R_3$ stand for a hydrogen atom or methyl and in which two adjacent symbols $R_2$ and $R_3$ can form a fused, aromatic, carbocyclic six-membered ring, is used as starting substance.

5. Process according to Claim 1, characterised in that a compound of the formula

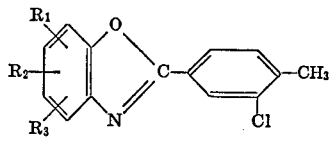

wherein $R_4$ denotes hydrogen, an alkyl group containing 2–4 C atoms, an alkoxy group containing 1–4 C atoms, benzyl, phenyl or chlorine, $R_5$ and $R_6$ stand for hydrogen or methoxy and two adjacent symbols $R_5$ and $R_6$ can form a fused, aromatic, carbocyclic six-membered ring, is used as starting substance.

6. Process according to Claim 1, characterised in that a compound of the formula

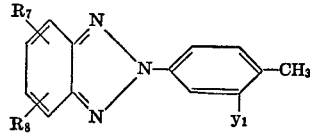

wherein R₇ and R₈ are identical or different and stand for hydrogen or an alkoxy group containing 1 to 4 carbon atoms, and two adjacent symbols R₇ and R₈ can form a fused, aromatic, carbocyclic six-membered ring or a methylenedioxy group, and wherein y₁ stands for hydrogen, chlorine or an N,N-dimethylcarbamyl group, is used as starting substance.

7. Process according to Claim 1, characterised in that a compound of the formula

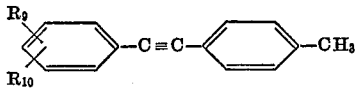

wherein R₉ denotes hydrogen, an alkoxy group containing 1 to 4 carbon atoms, phenyl or chlorine, R₁₀ stands for hydrogen or the methoxy group and two adjacent radicals R₉ and R₁₀ can form a fused, aromatic, carbocyclic six-membered ring or a methylenedioxy group, is used as starting substance.

8. Process according to Claim 1, characterised in that the oxidation is carried out at temperatures between 20 and 100° C. in the presence of 1 to 8 equivalents of potassium hydroxide, which can contain 0 to 15 percent by weight of water.

9. Process according to Claim 1, characterised in that azobenzene is used as oxidising agent.

10. A compound of the formula

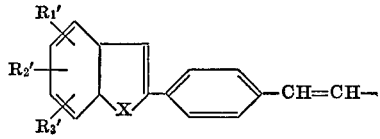

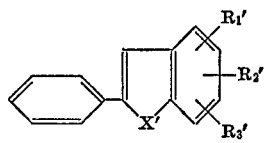

wherein R₁' denotes hydrogen, an alkyl group containing 1 to 4 carbon atoms, an alkoxy group containing 1 to 4 carbon atoms, benzyl, phenyl or chlorine, R₂' and R₃' stand for a hydrogen atom or methyl and in which two adjacent symbols R₂' and R₃' can form a fused, aromatic, carbocyclic six-membered ring, and X and X' are both sulfur or both oxygen.

11. A compound according to Claim 10 corresponding to the formula

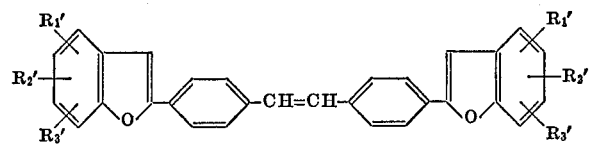

wherein R₁' denotes hydrogen, an alkyl group containing 1 to 4 carbon atoms, an alkoxy group containing 1 to 4 carbon atoms, benzyl, phenyl or chlorine and R₂' and R₃' stand for hydrogen or methyl.

12. A compound according to Claim 10 corresponding to the formula

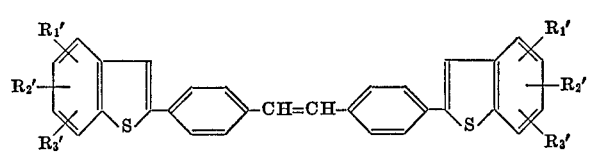

wherein R₁' denotes hydrogen, an alkyl group containing 1 to 4 carbon atoms, an alkoxy group containing 1 to 4 carbon atoms, benzyl, phenyl or chlorine and R₂' and R₃' stand for hydrogen or methyl.

13. The compound according to Claim 10 corresponding to the formula

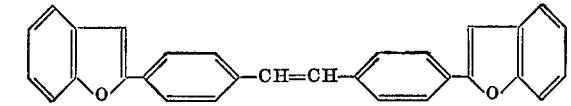

References Cited

Siegrist, et. al.; C. A. 71:71927; (1969) reference to S. African Pat. No. 68-04, 421.

Misumi, et al.; C.A. 56:15403 (1962) reference to *Bull. Chem. Soc. Japan 35*, 135–42 (1962).

HENRY R. JILES, Primary Examiner

C. M. S. JAISLE, Assistant Examiner

U.S. Cl. X.R.

252—301.2 W; 260—37 N, 37 P, 41 C, 240 CA, 558 A, 559 A, 612 R, 613 A, 649 R, 668 C